United States Patent
Richards

[15] 3,658,431
[45] Apr. 25, 1972

[54] PHOTOMICROGRAPHIC EXPOSURE METER

[72] Inventor: James V. Richards, King of Prussia, Pa.

[73] Assignee: American Optical Corporation, Southbridge, Mass.

[22] Filed: June 1, 1970

[21] Appl. No.: 42,003

[52] U.S. Cl. ................................. 356/227, 235/64.7
[51] Int. Cl. ............................. G01j 1/42, G06c 3/00
[58] Field of Search ........................ 356/227; 235/64.7

[56] References Cited

UNITED STATES PATENTS 3,488,125  1/1970  Gugliotta et al. .................. 356/224
2,533,489  12/1950  McFarlane et al. ................ 235/64.7

Primary Examiner—Ronald L. Wibert
Assistant Examiner—Conrad Clark
Attorney—William C. Nealon, Noble S. Williams and Robert J. Bird

[57] ABSTRACT

A photomicrographic exposure meter including a photocell to sense and register the light level of an in-focus specimen image and transmit the same to a light-level meter. In a mechanized nomogram having four scales, the independent parameters of film ASA rating and picture format are selected. The ASA and picture format dials are then locked into position with each other. A light-level scale, which is locked to the ASA scale, is turned to a reading corresponding to that on the light-level meter. The exposure time is then read out of the instrument on the exposure time scale. The shutter on the photomicrographic camera is then set to correspond to the indicated exposure time.

4 Claims, 6 Drawing Figures

PHOTOMICROGRAPHIC EXPOSURE METER

BACKGROUND OF THE INVENTION

The present invention relates to exposure meters for photography and more particularly to a direct reading exposure meter for use with a photomicrographic apparatus.

It is an object of the invention to provide a photomicrographic exposure meter which will permit a ready determination of the proper exposure required to make a photomicrograph by comparing a measured light level within the microscope apparatus with a corresponding light level on a nomographic scale which in turn provides an indicated camera exposure time.

Other objects, advantages and features of the present invention will become apparent from the following description of one embodiment thereof, when taken in connection with the accompanying drawing.

DRAWING

DESCRIPTION

Figure 1:
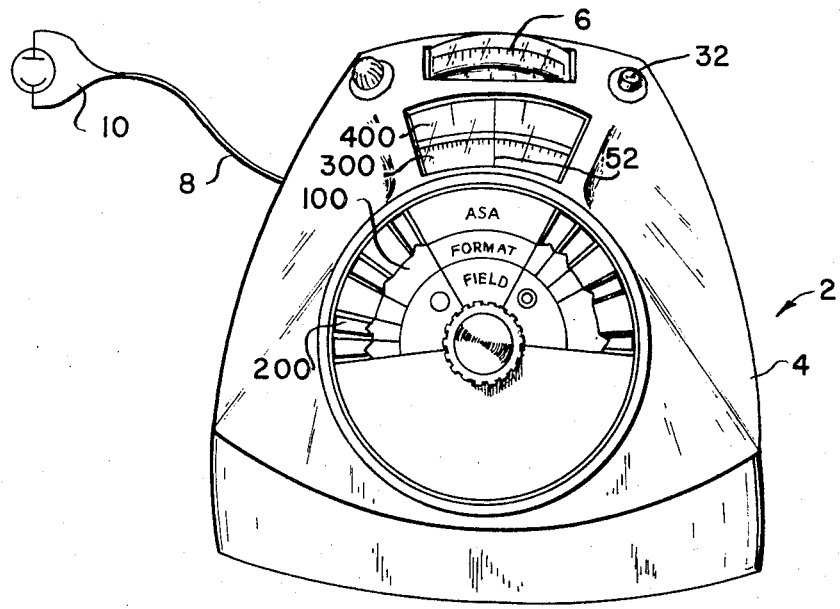
FIG. 1 is a front view of an exposure meter according to the present invention.

Referring now to FIG. 1, a photomicrographic exposure meter is shown in front view and is represented generally at 2. It includes a suitable casing 4 on which are mounted the various operative elements. An independent light-level meter 6 is mounted on casing 4 and is operatively connected through lead 8 to a photocell 10.

Figure 2:
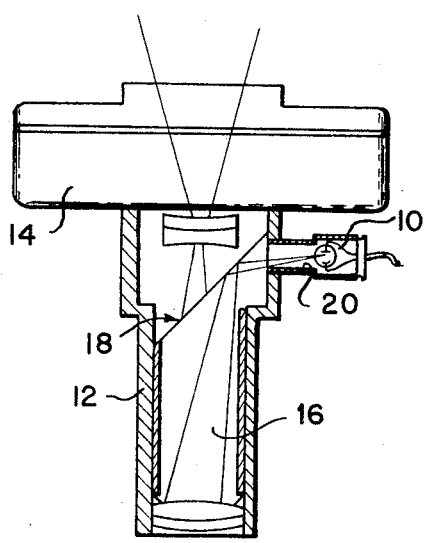
FIG. 2 is an elevation view, partly in section, of a camera and shutter attachment for a microscope.

FIG. 2 shows a part of a microscope used in connection with the exposure meter of this invention. In FIG. 2, a tube 12 encloses an extension of the microscope optical path 16. A camera 14 is mounted on tube 12 and is adapted for exposure to the optical path 16 of the microscope. A suitable beam splitter or mirror 18 is disposed along optical path 16 and adjacent an aperture 20 in the tube 12. Photocell 10 is mounted relative to aperture 20 so as to be accessible to light in optical path 16 and reflecting from beam splitter 18.

Figure 3:
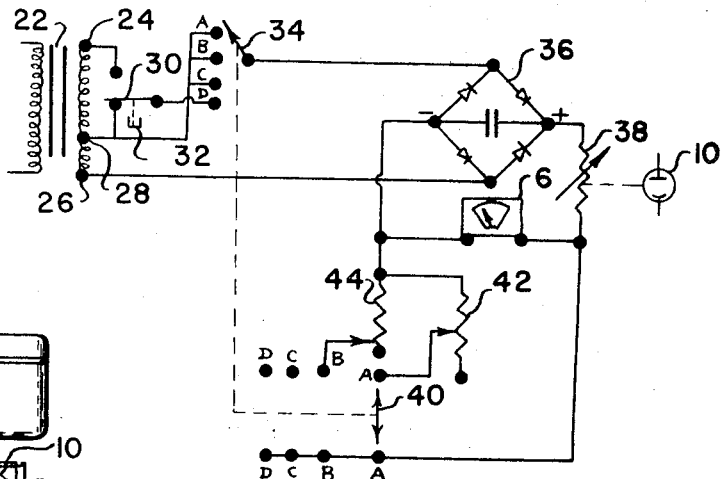
FIG. 3 is a diagram of the electrical circuit used in the exposure meter of this invention.

Referring now to FIG. 3, the electrical circuit diagram connecting photocell 10 with light-level meter 6 is shown. Supply voltage is introduced to the circuit through a step-down transformer 22. The secondary of transformer 22 has terminals 24 and 26 and a tap 28. By way of example and not of limitation, transformer 22 converts input voltage of 115 volts to output voltage of 86 volts between terminals 24 and 26, and 8.6 volts between terminal 26 and tap 28. As shown in FIG. 3, the secondary circuit is connected to terminal 26 and tap 28 to operate on the 8.6 or low voltage output. A switch 30 to disconnect tap 28 and connect terminal 24 to the secondary circuit is operatively connected to a push-button 32, which also appears in FIG. 1. The transformer secondary circuit further includes a four-position switch 34 and a full wave rectifier 36. Rectified current flows as indicated from the plus side of the rectifier, through a photoresistor 38 and through parallel circuits, to the minus side of rectifier 36. Photoresistor 38 is operatively connected to photocell 10, the light sensed in photocell 10 effecting changes in the resistance of resistor 38.

From photoresistor 38, the circuit includes two parallel paths. One parallel path includes an ammeter 6. The other parallel path includes a four-position switch 40 (which is operatively connected to four-position switch 34) by which this parallel path is provided with selective resistance values in order to alter the range of sensitivity of meter 6. Switches 34 and 40 are selectively positionable at positions A, B, C and D. When switch 40 is at position A, the parallel path includes a relatively low resistance 42, which is variable from, for example, 0–10 ohms. In position B, the parallel path includes a higher resistance 44 which is variable from, for example, 0–50 ohms. Position C represents an open switch such that all the load current from rectifier 36 goes through the ammeter 6. Position D of switch 40 likewise represents an open switch or infinite resistance such that the sole current path is again through ammeter 6.

When switches 34 and 40 are in position D, the high voltage output from transformer 22 can be taken by depressing push-button 32 and closing switch 30 on terminal 24. This raises the secondary voltage by a factor of 10 in the example given above.

Figure 5:
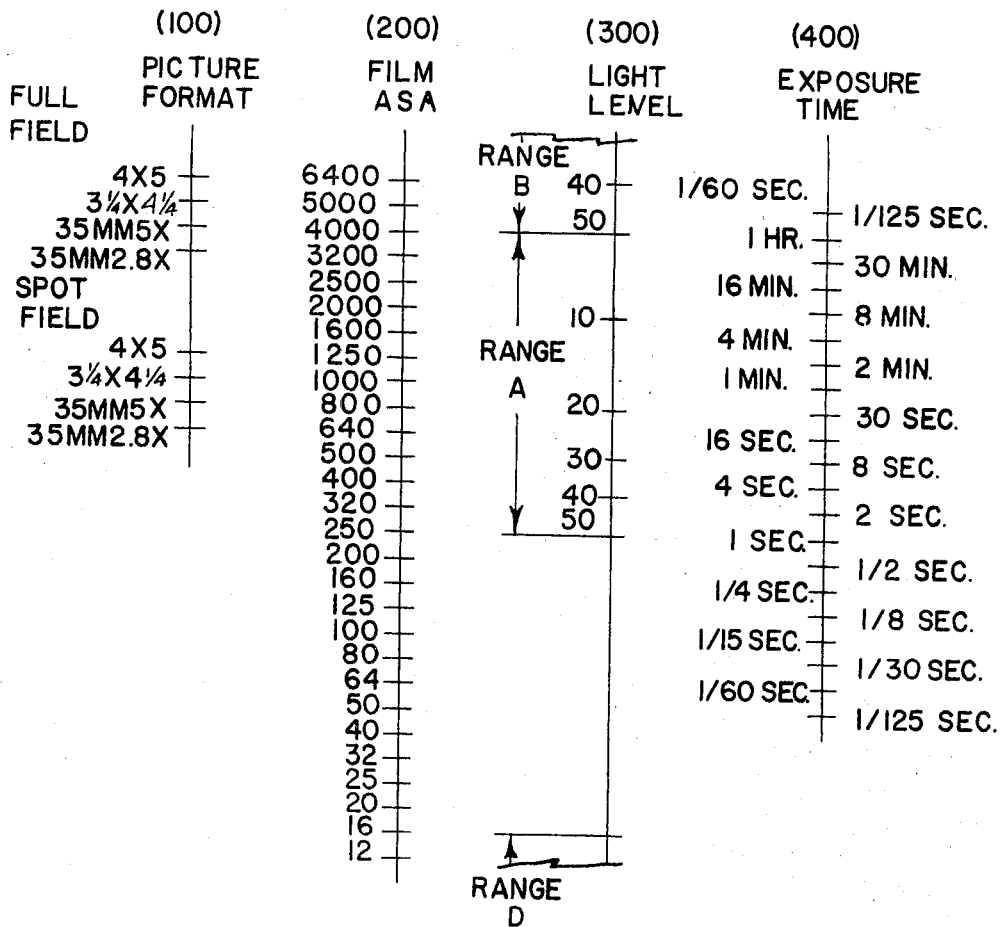
FIG. 5 is a straight-line representation of the nomogram or slide rule which is actually circular as shown in FIG. 4.

The chart of FIG. 5 shows a nomograph or slide rule arrangement illustrating part of the function of the present invention. There are shown four scales 100, 200, 300 and 400. Along scale 100 are locations corresponding to various photomicrographic picture formats including size of the film and whether the field to be photographed is full field or "spot" partial field. Scale 200 is a range of film ASA ratings. Light-level readings in four ranges (A, B, C and D) are logarithmically plotted along scale 300. Part of scale 300 is omitted for the sake of simplicity. Scale 400 is the readout scale and includes a range of exposure times for the photomicrographic camera equipment. Consider that scale 100 is physically fixed to, and movable with, scale 400. Also, that scales 200 and 300 are fixed to each other and movable relative to scales 100 and 400. The independent parameters in this nomogram or slide rule are the desired picture format (scale 100) and the film ASA rating (scale 200). The independent parameters of scales 100 and 200 are selected and the scales aligned by moving scales 200, 300 relative to scales 100, 400. The measured light level on meter 6 is then located on light-level scale 300. The exposure time corresponding to this light level is then read from scale 400. The photomicrographic camera shutter is then set at this value to take a proper picture. As an example, assume that the camera contains 4 by 5 film of ASA rating 800. The observed meter reading on meter 6 is 30 on the "A" range. When the ASA rating of 800 on scale 200 is aligned with the 4 by 5 spot picture format, the light-level reading 30 on scale 300 is aligned with 1 minute on the exposure time scale 400.

For mechanical convenience, the scales 100, 200, 300, and 400 are put on circular discs in the present invention. These appear in FIG. 4 as discs 100, 200, 300 and 400 respectively. These dials are all mounted for rotation on a common axis. Dials 100 and 400 are fastened and rotatable together. Similarly, dials 200 and 300 are fastened and rotatable together. When the independent parameters on scale 100 and scale 200 are selected and aligned, these scales are then held together such that the four scales then rotate as a unit relative to a stationary indicator line 52 (FIG. 1).

Figure 6:
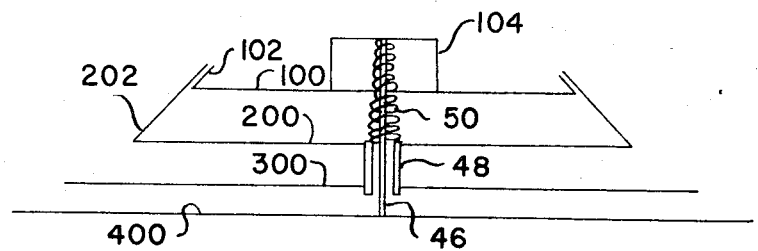
FIG. 6 is a somewhat schematic sectional elevation of the scales shown in FIG. 4.

FIG. 6 shows somewhat schematically a side sectional view of the four dials. Dials 100 and 400 are fastened to a shaft 46 and rotatable therewith. Dials 200 and 300 are similarly fastened to a second shaft 48, concentric with shaft 46. A compression spring 50 is disposed between dial 100 and dial 200. A conical clutching arrangement is provided at the peripheries of dials 100 and 200 such that, when spring 50 urges dial 100 upward, there is frictional clutching engagement between the conical periphery 102 of dial 100 and conical periphery 202 of dial 200. The central portion of disc 100 serves as a handwheel 104 for turning the same. When handwheel 104 is depressed against spring 50, only dials 100 and 400 are then moved by turning action of the handwheel 104. When handwheel 104 is released, spring 50 urges conical surfaces 102 and 202 together in clutching engagement. The outer surface of periphery 202 then becomes the handwheel for rotation of the entire set of dials.

The operation of the above-described dials is substantially as described in connection with the linear slide rule. That is, the independent variables of picture format on dial 100 and film ASA rating on dial 200 are selected and aligned. The dials are then rotated until the light-level reading on scale or meter 6 is found on dial 300 and aligned under a stationary cross hair or indicator line 52 on the instrument casing. (FIG. 1) The exposure time is then read directly from dial 400 at the indicator line.

Referring back to FIGS. 1 and 3, light-level meter 6 has a range of values from 5 to 50. If the secondary circuit in FIG. 3 has switches 34 and 40 in their A position, the lowest resistance 42 is positioned in the parallel circuit so that the light-level meter or ammeter 6 carries its smallest proportion of the total current in the secondary circuit. If the reading on meter 6 is very low, as for example below 5, then switches 34 and 40 can be positioned in their B position, increasing the resistance in the parallel circuit and thereby increasing the share of current carried by meter 6. Similarly, when switches 34 and 40 are in their C position, all the current in the secondary circuit flows through meter 6. In cases where measured light is very dim, as for example in fluorescence microscopy or dark field microscopy, the instrument can be made yet more sensitive by switching 34 and 40 to their D position and depressing push-button 32 to close switch 30 on terminal 24. This raises the voltage in the secondary circuit by a factor of 10 with all secondary current flowing through light meter 6.

Figure 4:
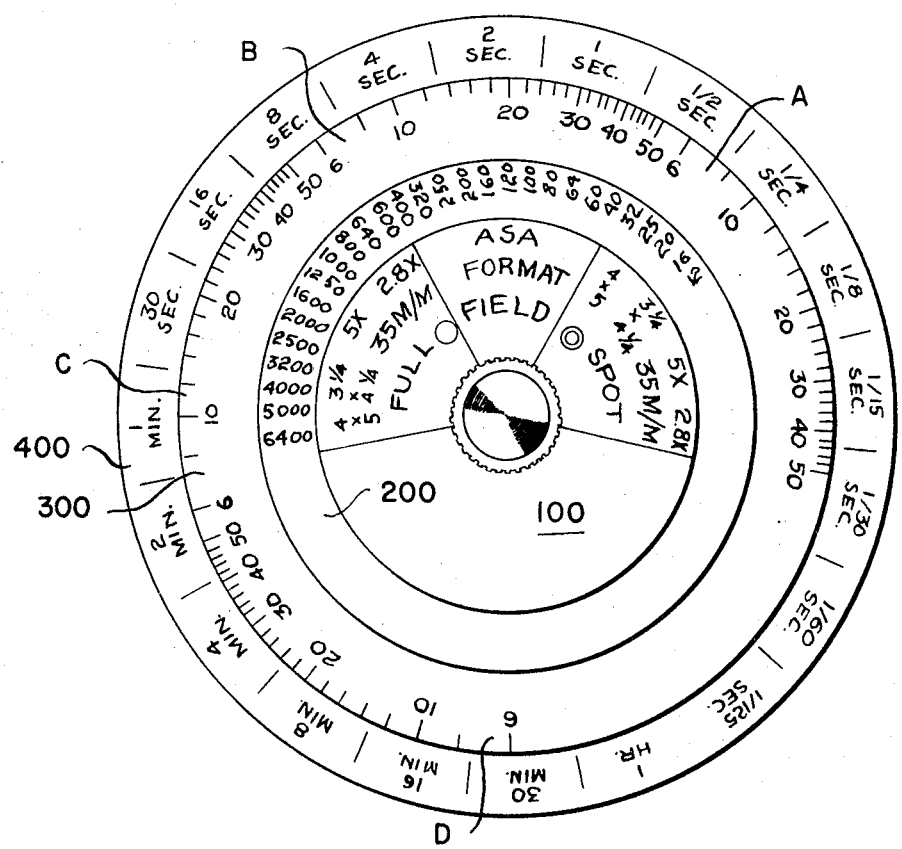
FIG. 4 is a plan view of the four circular parameter scales (shown in FIG. 1 but with casing removed) for use as a nomogram in the present invention.

There are four 5-50 ranges on scale 300 indicated in FIG. 4 by letters A, B, C and D. These letters and dial ranges correspond to the switch positions A, B, C and D respectively. The position (A, B, C or D) of switches 34 and 40 corresponds to the position of one of the ranges (A, B, C or D) of dial 300 relative to the cross hair or indicator line 52 on the instrument casing. That is, by placing one or another of the ranges (A, B, C or D) adjacent the indicator line 52, the corresponding switch position (A, B, C or D) is thereby occupied by switches 34 and 40. This is accomplished by a plurality of brushes (not shown) mounted on dial wheel 300 and a plurality of arcuate conductors or contacts (not shown) mounted on the casing 4 and disposed for contact with the brushes. The positioning of one of the ranges of scale 300 adjacent the indicator line 52 effects the appropriate contact between brushes and arcuate conductors placing switches 34 and 40 in A, B, C or D position. The initial reading of meter 6 is always made when the dial 300 is in the "A" range under indicator line 52 (and switches 34 and 40 are in position "A"). The reading of meter 6 in this range will indicate if greater meter sensitivity is required. If so, range B is tried, then range C, then D, if required.

The foregoing description concerns one embodiment of the present invention. The scope of this invention is not limited by certain of the details involved in this description. For example, voltage and resistance values were given by way of illustration and not of limitation. Additionally, the mechanism by which dials 100, 200, 300 and 400 are relatively movable and clutchable is only one of many known devices usable for this purpose.

It may occur to others of ordinary skill in the art to make modifications of this invention which will lie within its concept and scope and not constitute a departure. Accordingly, it is intended that the invention be not limited by the details of its description but only by the following claims.

What is claimed is:

1. A photomicrographic exposure meter for use with a microscope including:
   a photocell adapted for communication with the optical path of a microscope,
   a light-level meter operatively connected with said photocell to indicate light level in said optical path,
   a calculator having four circular coaxial scales rotatable relative to a frame, the first of said scales bearing photomicrograph format parameters, the second of said scales bearing film ASA parameters, the third of said scales bearing light-level parameters, the fourth of said scales bearing exposure-time parameters,
   said first and fourth scales being fixed relative to each other and rotatable relative to said second and third scales, said second and third scales also being fixed relative to each other,
   means to engage said first and fourth scales with said second and third scales for rotation in unison,
   a reference point on said frame as to which said third light-level scale is positioned to duplicate the reading observed on said light-level meter,
   said fourth exposure time scale indicating at said reference point an exposure time for a photomicrographic camera.

2. An exposure meter as defined in claim 1 in which said light-level meter has a plurality of sensitivities and said third light-level scale has a corresponding number of light-level ranges.

3. An exposure meter as defined in claim 1 in which said light-level meter is operatively connected to a circuit, said circuit including a photoresistor which is variable by said photocell.

4. An exposure meter for a photomicrographic camera including:
   a photocell adapted for communication with the optical path of a microscope, said photocell operatively connected to a photoresistor,
   a light-level meter operatively connected with said photocell to indicate light level in said optical path,
   means for varying the sensitivity of said light-level meter so as to correspondingly vary the range of its recorded parameter,
   means to vary the input voltage to said photoresistor,
   a calculator having four circular coaxial scales rotatable relative to a frame, the first of said scales bearing photomicrographic format parameters, the second of said scales bearing film ASA parameters, the third of said scales bearing light-level parameters, the fourth of said scales bearing exposure-time parameters,
   said first and fourth scales being fixed relative to each other and rotatable relative to said second and third scales, said second and third scales also being fixed relative to each other,
   means to engage said first and fourth scales with said second and third scales for rotation in unison,
   a reference point on said frame as to which said third light-level scale is positioned to duplicate the reading observed on said light-level meter,
   said fourth exposure time scale indicating at said reference point an exposure time for a photomicrographic camera.

* * * * *